Figure 1:
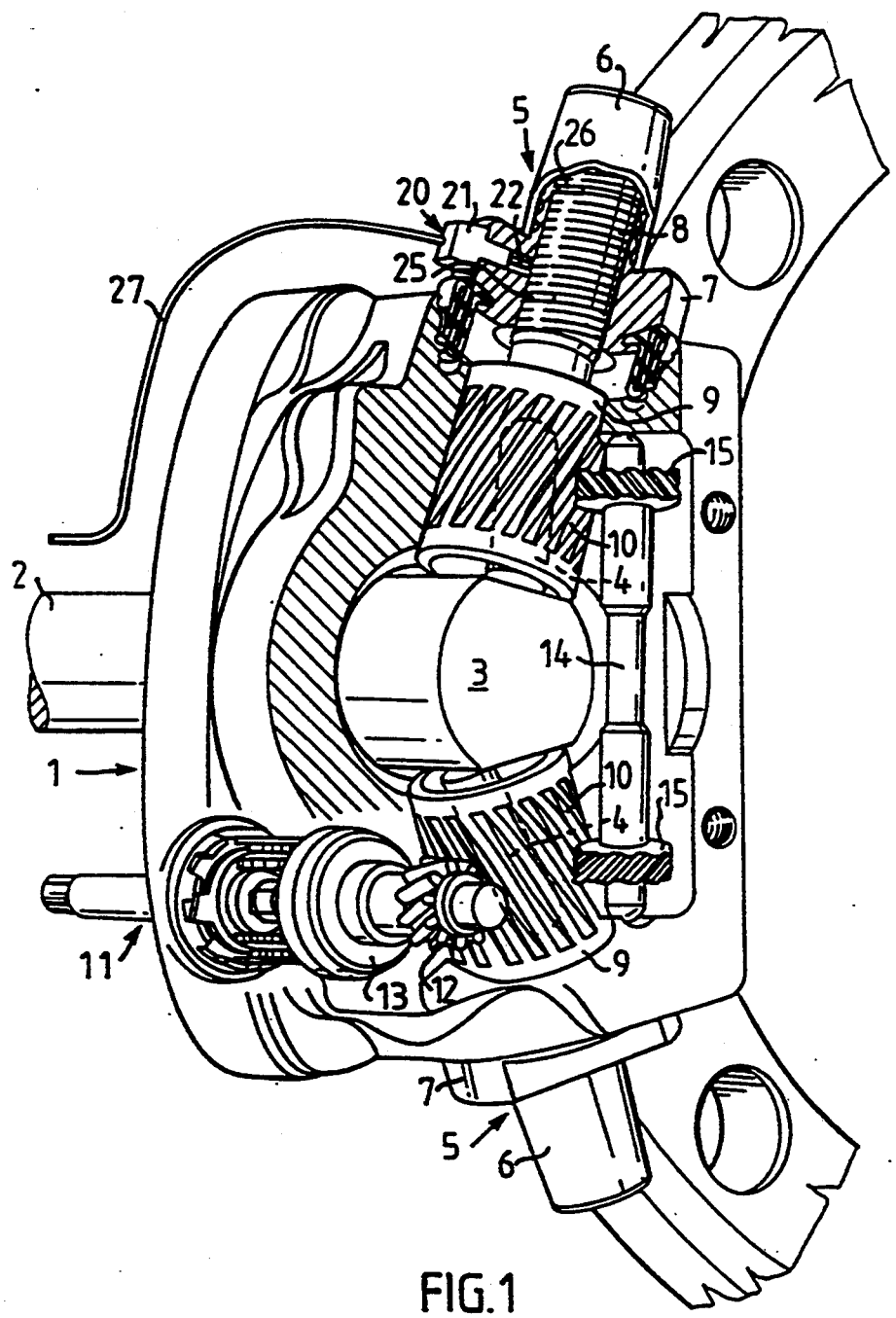

United States Patent [19]
Angerfors

[11] Patent Number: 5,410,293
[45] Date of Patent: Apr. 25, 1995

[54] DEVICE FOR INDICATING BRAKE LINING WEAR

[75] Inventor: Dan Angerfors, Floda, Sweden

[73] Assignee: AB Volvo, Gothenburg, Sweden

[21] Appl. No.: 66,096

[22] PCT Filed: Nov. 28, 1991

[86] PCT No.: PCT/SE91/00812

§ 371 Date: Sep. 15, 1993

§ 102(e) Date: Sep. 15, 1993

[87] PCT Pub. No.: WO92/09822

PCT Pub. Date: Jun. 11, 1992

[30] Foreign Application Priority Data

Nov. 28, 1990 [SE] Sweden .................. 9003791

[51] Int. Cl.6 .................................. B60Q 1/00
[52] U.S. Cl. .................. 340/454; 340/453; 188/1.11; 200/61.40; 200/61.44
[58] Field of Search .......... 340/454, 453; 188/1.11, 188/73.38, 79, 79.55; 200/61.40, 61.44

[56] References Cited

U.S. PATENT DOCUMENTS

| | | |
|---|---|---|
| 3,388,773 | 6/1968 | Quinn . |
| 4,013,143 | 3/1977 | Juhasz . |
| 4,015,693 | 4/1977 | Hayashida et al. . |
| 4,396,097 | 8/1983 | Bayliss . |
| 5,087,907 | 2/1992 | Weiler et al. .................. 200/61.4 |
| 5,253,735 | 10/1993 | Larsen et al. .................. 188/1.11 |
| 5,255,760 | 10/1993 | Lamb et al. .................. 340/454 |
| 5,263,556 | 11/1993 | Frania .................. 188/79.55 |
| 5,339,069 | 8/1994 | Penner et al. .................. 340/454 |

FOREIGN PATENT DOCUMENTS

| | | |
|---|---|---|
| 0093657 | 11/1983 | European Pat. Off. . |
| 0251848 | 1/1988 | European Pat. Off. . |
| 1600223 | 3/1970 | Germany . |
| 2053592 | 5/1972 | Germany . |

*Primary Examiner*—John K. Peng
*Assistant Examiner*—Nina Tong
*Attorney, Agent, or Firm*—Young & Thompson

[57] ABSTRACT

Wear warning device for indicating wear in brake lining and drum in drum brakes for motor vehicles with automatic brake adjustment. In a drum brake with a lifter and adjustment devices (5), comprising an internally threaded lifter head (7) and a lifter screw (8) screwed therein, the wear warning device comprises a switch (20) supported by the lifter head, the switch having an axially displaceable pin (22) in contact with the thread of the screw (8). the screw is provided at its distal end with a depression (26) in the thread. When the pin moves down into the depression, the circuit in the switch is closed in order to activate a warning device.

5 Claims, 2 Drawing Sheets

DEVICE FOR INDICATING BRAKE LINING WEAR

The present invention relates to a device for indicating wear on the cooperating frictional surfaces in vehicle brakes, comprising an electrical switch means disposed, upon a certain amount of wear on at least one of the said frictional surfaces, to activate a warning device.

Devices for indicating brake lining wear, so-called wear-detectors, are used for example in drum brakes for trucks, which have devices for automatically adjusting the play between the brake shoe lining and the wear surface of the drum in pace with the wear on the brake lining and the drum.

The wear detector serves in this case to increase safety and help the vehicle owner to plan for replacement of brake linings, thus reducing both down-time and shop costs.

A known type of wear detector comprises a sensor in the form of a switch cast in the lining material and connected to an electric circuit. When the lining layer above the switch has been worn away exposing the switch and when it comes into contact with the metal in the drum, a circuit is closed which activates a warning device, e.g. a warning light on the instrument panel of the vehicle.

A wear detector of this type has a number of disadvantages. The sensor embedded in the lining must be of the disposable type and thus be disconnected when the lining is replaced. It measures (indicates) only lining wear, and this creates uncertainty as to the total wear (lining and drum wear) and how must adjustment can be done before replacement is necessary. This is especially pronounced for asbestos-free linings which are made of a material which causes more wear to the drums than asbestos lining. If, for example, the lining is only halfway worn but the drum is so worn that the combined total wear is such that the adjustment device has reached a position corresponding to the maximum stroke length of the braking mechanism, there will still be no activation of the warning device in this previously known type of wear detector.

One purpose of the present invention is in general to provide a wear detector of the type described by way of introduction, which can indicate when the combined drum and lining wear amounts to a pre-determined value, regardless of the individual wear to each of the components, and which does not need to be disconnected or replaced during normal lining replacement.

This is achieved according to the invention by virtue of the fact that said switch means has a sensor means which is coordinated with a pair of interacting adjustment elements for adjusting play between the friction surfaces, said elements being adjustable to various positions relative to each other, and in that the sensor means are disposed to sense the relative positions of the adjustment elements and, at a certain pre-determined setting, actuate the switch means to activate the warning device.

By coordinating, in accordance with the invention, the wear detector with the adjustment mechanism instead of with the brake lining, one eliminates the uncertainty arising when only the lining wear is measured. The wear detector does not need to be disconnected when the linings or drums are replaced and it can be placed in an environment which is more protective than that of the lining material itself and, if needed, it can be easily replaced.

An additional purpose of the invention is to provide a wear detector which is particularly suited to a vehicle brake where the adjusting elements consist of a screw and nut device, e.g. of the type used in a so-called "Z cam brake". This type of brake has an internally threaded lifter head, into which a lifter screw has been screwed. A further development of the invention described above for such a vehicle brake is characterized in that the sensor means is displaceably supported by the nut means and has a portion in contact with the threaded portion of the screw, that its threaded portion is made with at least one interruption in the uniformity of the thread, and that the sensing means, upon contact with said interruption, is disposed to actuate the switch means to activate the warning device.

Such a device also makes it possible to achieve in a simple manner a mechanism blocking means, which after a certain amount of readjustment after activation of the warning device locks the screw and nut arrangement together. This prevents, for example, in a so-called "Z cam brake", the lifter head from being locked in an outer position in the automatic adjustment. Such locking in an outer position would otherwise cause damage to the adjustment device, the brake shoes and the cover sleeves of the brake. Furthermore, in this case the inner wear edge of the drum prevents removal of the drum, so that the drum must first be cut into pieces for removal.

Figure 2:
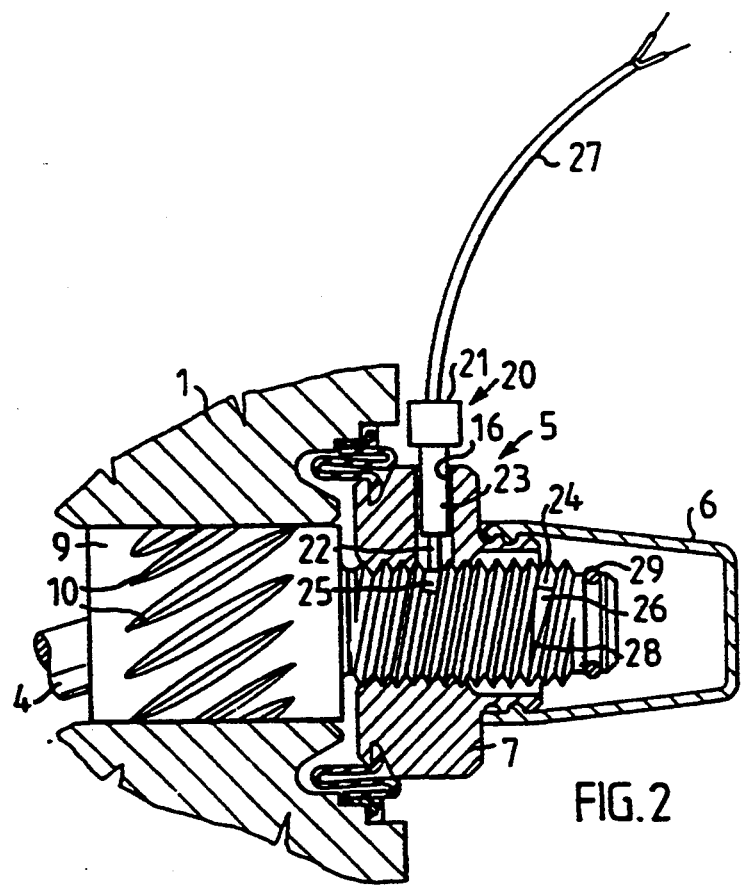
Figure 3:
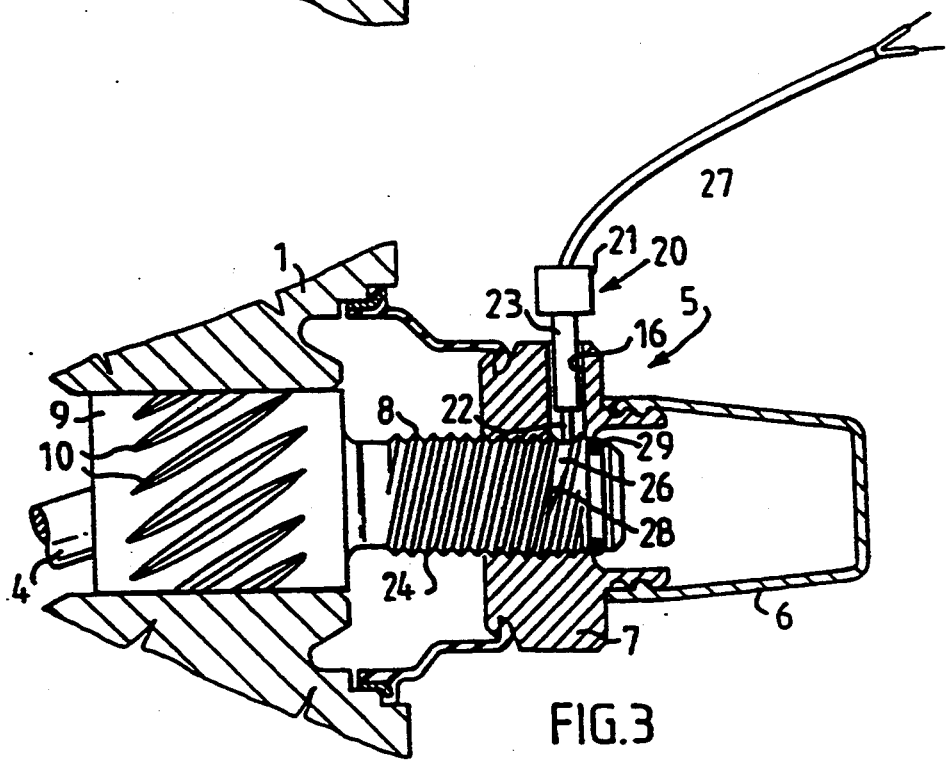

The invention will now be described in more detail with reference to an example shown in the accompanying drawing, where FIG. 1 shows a partial cut-away perspective view of a cam housing in a Z cam brake, which is known per se, with a wear detector according to the invention, and FIGS. 2 and 3 show the adjustment mechanism of FIG. 1 in a first and a second end position, respectively.

In FIG. 1, I designates a cam housing in a drum brake of Z cam type, in which a shaft 2 is rotatably journalled. The shaft 2 can be rotated by a brake servo device (not shown) and is provided at its end with a so-called brake key 3 with pins 4 which extend into individual lifting and adjusting devices (generally designated 5).

As the shaft 2 is turned, the pins 4 push the devices 5 outwards, whereupon covers 6 abutting the ends of the brake shoes (not shown) push the brake shoes against the friction surface of the surrounding brake drum (not shown).

Each lifting and adjusting device 5 comprises an internally threaded lifter head 7, to which the cover 6 is fixed. A lifter screw 8 is screwed into the lifter head 7 and is fixed at one end to a sleeve 9, into which the pins 7 extend and which are externally provided with helically cut grooves 10. A so-called adjuster spindle 11 with a gear 12 with obliquely cut teeth in engagement with the grooves 10 in the sleeve 9 is rotatably and axially displaceably mounted in the cam housing 1. On the adjuster spindel 11 a brake cone 13 is fixed. The brake cone 13 is normally in contact with a seat (not shown) in the cam housing 1 and brakes the spindel 11 against rotation. There is a small play between the helical grooves 10 of the sleeve 9 and the teeth of the gear 12, and this permits displacement of the lifter device 5 outwards to normally press the brake shoes against the drum without there occurring any relative rotation between the sleeve and the gear.

When the linings and/or the drum have been worn so much that adjustment is required, the lift devices 5 must be displaced further out in order to press the brake shoes against the drum. The play between the teeth of the gear 12 and the helical grooves 10 in the sleeve is then taken up first and the adjuster spindle 11 is displaced axially, so that the brake cone 13 is lifted from its seat, whereafter the spindle 11 is turned under the influence of the lifter device 5 when it continues to move outwards. When the brake is released and the lifter device 5, under the influence of springs (not shown) is moved back to its original position, the adjuster spindle 11, under the influence of the engagement between the teeth and the helical grooves, will first be displaced axially, so that the brake cone 13 is pressed against its seat locking the spindle against rotation. As the lifter device 5 continues to move, the sleeve 9 under the influence of the blocked gear 12 will turn together with the lifter screw 8, which is screwed relative to the lifter head 7, so that the effective length of the lifter device 5 increases. Via a transverse shaft 14 with gears 15, the adjustment movement is transmitted from the lower to the upper lifter device 5.

FIGS. 2 and 3 show the minimum and maximum lengths, respectively, of the lifter device.

As is most clearly shown in FIGS. 2 and 3, the lifter head 7 is made with a radial through-bore 16, in which an electrical switch means, generally designated 20, is fixed. The switch means 20 comprises a microswitch 21, which is actuated by a pin 22, which is axially displaceably housed in a sleeve 23 fixed in the bore 16. The pin 22 is spring-biased outwards, so that its end is kept in contact with the thread on the lifter screw 8. In the example shown, the pin 22 is directed so that its end is in contact with the crest 24 of the thread, but as an alternative it can be directed towards the bottom between the threads.

The thread crest 24 of the lifter screw 8 has been filed down at two places so as to make a pair of interruptions 25, 26 forming depressions in the thread crest 24. These interruptions or depressions 25, 26 are adapted to the pin 22 in such a way that the pin, when it rides on the thread crest 24, and is thus in its retracted position, breaks the current in the microswitch 21 and, when it is in one of the depressions 25, 26 and is thus in its extended position, closes the circuit in the microswitch 21. Via a wire 27, the switch is connected to a warning device (not shown), for example an indicator lamp and/or a beep signal.

The outer depression 26 is placed relative to the pin 22 so that the pin, when it enters the depression, indicates, via the warning device, that the sum of the wear on the brake lining and the drum warrants lining and/or drum replacement. The depression 26 has a peripheral extension which permits a certain amount of further adjustment before complete brake failure occurs, so that there is sufficient time to plan service. The end edge 28 of the depression 26, against which the pin 22 is moved during automatic adjustment, can be made so that the pin, in its final contact with the edge 28, functions as a mechanical stop, preventing additional extension of the lifter device. This stop can then replace the stop ring, which is normally to be found at the end of the lifter screws of a Z cam brake. Such a stop ring 29 is shown in FIGS. 2 and 3. By being able to eliminate this ring, this assembly of the lifter head 7 for replacement or renovation is facilitated.

The inner groove 25 has nothing to do with the wear warning function. Rather, it is designed to indicate an inner end position, in which the components are normally never at. An indication of the inner end position could mean, for example, improperly adjusted brakes after replacing the brake lining.

I claim:

1. A device for indicating wear on cooperating frictional surfaces in vehicle brakes, comprising an electrical switch means, disposed, upon a certain amount of wear on at least one of said frictional surfaces, to activate a warning device, said switch means having a sensor means which is coordinated with a pair of interacting adjustment elements, characterized in that the adjusting elements comprise a screw and nut arrangement which comprising a screw and a nut in threaded engagement with each other, that the sensor means (22) is displaceably supported by the nut (7) and has a portion in contact with the threaded portion of the screw (8), that the threaded portion is made with at least one interruption (26) in the uniformity of the thread, and that the sensor means, upon contact with said interruption, is disposed to actuate the switch means (20) to activate the warning device.

2. Advice according to claim 1, characterized in that the sensor means (22) and the interruption (26) are so formed relative to each other that, upon contact with each other, they mechanically block the screw and the nut (7, 8) of the screw and nut arrangement (5) against relative rotation.

3. A device according to claim 1, characterized in that the sensor means is formed of a pin (22) axially displaceable in a carrier (23) in the nut (7), said pin having an outer end in contact with the screw thread and an inner end actuating the switch means (20) depending on the axial displacement of the pin.

4. A device according to claim 3, characterized in that the pin (22) is spring-biased towards and is arranged to ride on the thread crest, and that the interruption (26) is formed in a groove in the thread crest.

5. A device according to claim 3, characterized in that the pin is spring-biased towards and is arranged to slide in the thread bottom, and that the interruption is formed in a groove in the thread bottom.

* * * * *